United States Patent
Lee et al.

(10) Patent No.: US 8,173,042 B2
(45) Date of Patent: May 8, 2012

(54) STRONTIUM OXYORTHOSILICATE PHOSPHORS HAVING IMPROVED STABILITY UNDER A RADIATION LOAD AND RESISTANCE TO ATMOSPHERIC HUMIDITY

(75) Inventors: Chung Hoon Lee, Ansan-si (KR);
Walter Tews, Greifswald (DE);
Gundula Roth, Levenhagen (DE);
Detlef Starick, Greifswald (DE)

(73) Assignees: Seoul Semiconductor Co., Ltd., Seoul (KR); LITEC-LP GmbH, Greifswald (DE)

( * ) Notice: Subject to any disclaimer, the term of this patent is extended or adjusted under 35 U.S.C. 154(b) by 0 days.

(21) Appl. No.: 12/879,361

(22) Filed: Sep. 10, 2010

(65) Prior Publication Data
US 2011/0147662 A1 Jun. 23, 2011

(30) Foreign Application Priority Data
Dec. 21, 2009 (DE) .................. 10 2009 059 798

(51) Int. Cl.
*C09K 11/08* (2006.01)
*C09K 11/70* (2006.01)
*C09K 11/66* (2006.01)

(52) U.S. Cl. ..... 252/301.4 F; 252/301.6 F; 252/301.6 R

(58) Field of Classification Search ........... 252/301.4 R, 252/301.6 R, 301.6 P, 301.4 P, 301.4 H, 301.4 F, 252/301.6 F; 313/467, 468
See application file for complete search history.

(56) References Cited

U.S. PATENT DOCUMENTS

| | | | |
|---|---|---|---|
| 7,554,129 B2 * | 6/2009 | Roth et al. ................ 257/100 |
| 2005/0274930 A1 * | 12/2005 | Roth et al. ............ 252/301.4 R |
| 2006/0012284 A1 | 1/2006 | Kim et al. |
| 2006/0163683 A1 | 7/2006 | Roth et al. |
| 2007/0029526 A1 * | 2/2007 | Cheng et al. ........... 252/301.4 F |
| 2008/0111472 A1 * | 5/2008 | Liu et al. .................... 313/503 |
| 2008/0231166 A1 | 9/2008 | Su |
| 2009/0015137 A1 * | 1/2009 | Su et al. .................... 313/503 |
| 2009/0072255 A1 * | 3/2009 | Takahashi et al. ............ 257/98 |
| 2009/0289546 A1 * | 11/2009 | Igarashi et al. ............. 313/503 |
| 2010/0079058 A1 | 4/2010 | Schmidt et al. |
| 2010/0200874 A1 | 8/2010 | Shioi et al. |
| 2011/0068697 A1 | 3/2011 | Hum |

FOREIGN PATENT DOCUMENTS

| | | |
|---|---|---|
| JP | 2004-161982 | 6/2004 |
| JP | 2008-081631 | 4/2008 |
| KR | 10-2007-0082952 | 8/2007 |
| WO | 2004-056939 | 7/2004 |
| WO | 2004-067677 | 8/2004 |
| WO | 2004/085570 | 10/2004 |
| WO | 2006/081803 | 8/2006 |
| WO | WO 2006081803 A1 * | 8/2006 |
| WO | 2006-131795 | 12/2006 |
| WO | 2007-004138 | 1/2007 |

OTHER PUBLICATIONS

"Application of Strontium Silicate Yellow Phosphor for White Light-emitting Diodes" by Park, Joung-Kyu, et al., in Appl. Phys. Lett. 84 (2004), 1647-49.
"Photoluminescence properties of Eu2+-activated Sr3SiO05 phosphors" by Jee, Soon-Duc, et al., in J. Mater. Sci. 41 (2006), 3139-41.
International Search Report for PCT/KR2010/005836 issued on May 24, 2011.
Written Opinion for PCT/KR2010/005836 issued on May 24, 2011.
International Search Report of PCT/KR2010/008922 mailed on Aug. 18, 2011.
Written Opinion of PCT/KR2010/008922 mailed on Aug. 18, 2011.
Non-Final Office Action of U.S. Appl. No. 12/972,996 issued on Dec. 8, 2011.

* cited by examiner

*Primary Examiner* — Jerry Lorengo
*Assistant Examiner* — Lynne Edmondson
(74) *Attorney, Agent, or Firm* — H.C. Park & Associates, PLC

(57) ABSTRACT

Exemplary embodiments of the present invention relate to inorganic phosphors based on silicate compounds having improved stability under a resulting radiation load and resistance to atmospheric humidity, which are capable of converting higher-energy excitation radiation, i.e. ultraviolet (UV) or blue light, with high efficiency into a longer-wavelength radiation which may be in the visible spectral range. A calcium molar fraction x having a value between 0 and 0.05 is added to a silicate phosphor having the general formula $Sr_{3-x-y-z}Ca_xM^{II}_ySiO_5:Eu_z$.

2 Claims, 5 Drawing Sheets

Fig. 3

| Materials | Ca content molar fractions x | Lattice constants a = b | Lattice constants c | Phase composition Sr₃SiO₅ tetragonal | Phase composition Sr₂SiO₄ orthorhombic | Phase composition Sr₂SiO₄ monoclinic |
|---|---|---|---|---|---|---|
| Commercially available Sr₃SiO₅:Eu | | 6.962 | 10.771 | 91 | 7 | 2 |
| Sr₂.₉₅Ba₀.₀₁Eu₀.₀₄SiO₅ – Reference | | 6.957 | 10.770 | 93 | 5 | 2 |
| Sr₂.₉₅₋ₓBa₀.₀₁CaₓEu₀.₀₄SiO₅ | 0.01 | 6.953 | 10.765 | 95 | 5 | |
| Sr₂.₉₅₋ₓBa₀.₀₁CaₓEu₀.₀₄SiO₅ | 0.02 | 6.950 | 10.760 | 93 | 7 | |
| Sr₂.₉₅₋ₓBa₀.₀₁CaₓEu₀.₀₄SiO₅ | 0.05 | 6.949 | 10.761 | 90 | 8 | 2 |
| Sr₂.₉₅₋ₓBa₀.₀₁CaₓEu₀.₀₄SiO₅ | 0.075 | 6.947 | 10.755 | 79 | 19 | 2 |
| Sr₂.₉₅₋ₓBa₀.₀₁CaₓEu₀.₀₄SiO₅ | 0.1 | 6.945 | 10.752 | 58 | 42 | |
| Sr₂.₉₅₋ₓBa₀.₀₁CaₓEu₀.₀₄SiO₅ | 0.15 | 6.937 | 10.755 | 9 | 84 | 5 |

Fig. 4

| Material | Powder intensity 450 nm excitation % | Colour coordinates | | FWHM nm | Intensity 150°C % |
|---|---|---|---|---|---|
| | | x value | y value | | |
| Commercially available $Sr_3SiO_5$:Eu | 98.3 | 0.5420 | 0.4560 | 68.1 | 91.3 |
| $Sr_{2.95}Ba_{0.01}Eu_{0.04}SiO_5$ – Reference | 100 | 0.5373 | 0.4604 | 68.4 | 91.5 |
| $Sr_{2.94}Ba_{0.01}Ca_{0.01}Eu_{0.04}SiO_5$ | 100 | 0.5396 | 0.4581 | 67.8 | 92.1 |
| $Sr_{2.93}Ba_{0.01}Ca_{0.02}Eu_{0.04}SiO_5$ | 101.3 | 0.5395 | 0.4582 | 68 | 92.0 |
| $Sr_{2.90}Ba_{0.01}Ca_{0.05}Eu_{0.04}SiO_5$ | 100.8 | 0.5414 | 0.4564 | 68.1 | 91.6 |
| $Sr_{2.875}Ba_{0.01}Ca_{0.075}Eu_{0.04}SiO_5$ | 92.5 | 0.5401 | 0.4575 | 70.3 | 87.5 |
| $Sr_{2.85}Ba_{0.01}Ca_{0.1}Eu_{0.04}SiO_5$ | 79.3 | 0.5374 | 0.4599 | 72.6 | 85.2 |
| $Sr_{2.80}Ba_{0.01}Ca_{0.15}Eu_{0.04}SiO_5$ | 52.2 | 0.5142 | 0.4782 | 86.7 | 70.8 |

Fig. 5

| Material | Powder intensity 450 nm excitation % | Intensity 150°C % | Intensity after moist atmosphere test % |
|---|---|---|---|
| Commercially available $Sr_3SiO_5$:Eu | 98.3 | 91.3 | 69.3 |
| $Sr_{2.95}Ba_{0.01}Eu_{0.04}SiO_5$ – Reference | 100 | 91.6 | 72.0 |
| $Sr_{2.94}Ba_{0.01}Ca_{0.01}Eu_{0.04}SiO_5$ | 100 | 92.1 | 91.2 |
| $Sr_{2.93}Ba_{0.01}Ca_{0.02}Eu_{0.04}SiO_5$ | 101.3 | 92.0 | 96.3 |
| $Sr_{2.90}Ba_{0.01}Ca_{0.05}Eu_{0.04}SiO_5$ | 100.8 | 91.6 | 94.6 |
| $Sr_{2.875}Ba_{0.01}Ca_{0.075}Eu_{0.04}SiO_5$ | 92.5 | 87.5 | 85.8 |
| $Sr_{2.85}Ba_{0.01}Ca_{0.1}Eu_{0.04}SiO_5$ | 79.3 | 85.2 | 77.3 |
| $Sr_{2.80}Ba_{0.01}Ca_{0.15}Eu_{0.04}SiO_5$ | 52.2 | 70.8 | 71.7 |

STRONTIUM OXYORTHOSILICATE PHOSPHORS HAVING IMPROVED STABILITY UNDER A RADIATION LOAD AND RESISTANCE TO ATMOSPHERIC HUMIDITY

CROSS-REFERENCE TO RELATED APPLICATION

This application claims priority from and the benefit of German Patent Application No. 10 2009 059 798.0, filed on Dec. 21, 2009, which is hereby incorporated by reference for all purposes as if fully set forth herein.

BACKGROUND OF THE INVENTION

1. Field of the Invention

Exemplary embodiments of the present invention relate to inorganic phosphors based on silicate compounds which convert higher-energy excitation radiation, i.e. ultraviolet (UV) or blue light, with high efficiency into a longer-wavelength radiation which may be in the visible spectral range.

2. Discussion of the Background

Phosphors may be used in light sources such as light emitting diodes (LEDs), which emit colored or white light. In an LED, phosphors, which may be used in combination with other luminophores, are used to convert ultraviolet or blue primary radiation emanating from the LED into a longer wavelength secondary radiation, in particular white light.

Although various phosphors having high luminescent output, such as cerium-doped yttrium aluminium garnets, europium-activated alkaline earth metal orthosilicates, and similarly doped nitrides of different composition, have already been described for these applications, further efforts to develop improved materials for use in LEDs are known. The development trends consist in particular in finding phosphors having improved temperature characteristics and having higher stability under the resulting radiation load and under the influence of atmospheric humidity and other environmental factors. Such luminophores may be required for the production of LED lamps having a relatively high power consumption and improved lifetime.

Europium-activated alkaline earth metal oxyorthosilicates of the general type $Sr_3SiO_5$:Eu have become known for use in LEDs which emit colored or white light. Such phosphors are described, for example, in WO 2004/085570A1 and WO 2006/081803A1 and in various scientific publications, such as "Application of Strontium Silicate Yellow Phosphor for White Light-emitting Diodes" by Park, Joung-Kyu, et al., in Appl. Phys. Lett. 84 (2004), 1647-49, and "Photoluminescence properties of $Eu^{2+}$-activated $Sr_3SiO_5$ phosphors" by Jee, Soon-Duc, et al., in J. Mater. Sci. 41 (2006), 3139-41.

The known luminophores emit light in the yellow to orange range of the visible spectrum and are distinguished by high luminescent efficiencies and extremely low thermal is quenching up to temperature values of 250° C. In this respect, they are substantially superior to the orthosilicates, likewise emitting between 580 and 610 nm, as an orange component in phosphor mixtures for warm white LEDs and, because of these advantageous properties and owing to the substantially lower production costs, could compete even with the red-emitting nitride phosphors increasingly favored for these applications.

However, under specific conditions LEDs produced from such phosphors may have a comparatively short lifetime. A possible cause of this disadvantageous behavior may be the relatively high moisture sensitivity of the europium-doped alkaline earth metal oxyorthosilicates. As a result, industrial utility of these luminophores may be prevented or complicated in certain areas.

SUMMARY OF THE INVENTION

Exemplary embodiments of the present invention provide chemically modified oxyorthosilicate phosphors having increased stability under exposure to atmospheric humidity, which are suitable as efficient radiation converters for use in different technical applications.

Additional features of the invention will be set forth in the description which follows, and in part will be apparent from the description, or may be learned by practice of the invention.

An exemplary embodiment of the present invention discloses a silicate phosphor having the formula $Sr_{3-x-y-z}Ca_x M^{II}_y SiO_5$:$Eu_z$ wherein $M^{II}$ is a divalent metal ion including at least one of Mg, Ba, Cu, Zn, and Mn, $0 \leq x \leq 0.05$, $0 \leq y \leq 0.5$, and $0 < z \leq 0.25$.

It is to be understood that both the foregoing general description and the following detailed description are exemplary and explanatory and are intended to provide further is explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 shows lattice constants and the fractions, calculated from the diffraction diagrams, of the different crystallographic phases formed.

FIG. 4 shows optical and performance parameters of exemplary phosphors having a low Ca fraction and of comparative materials.

FIG. 5 shows results of the investigation of the moisture stability of the oxyorthosilicate phosphors according to the invention having a low Ca fraction and of silicate mixed phases.

DETAILED DESCRIPTION OF THE ILLUSTRATED EMBODIMENTS

Figure 1:
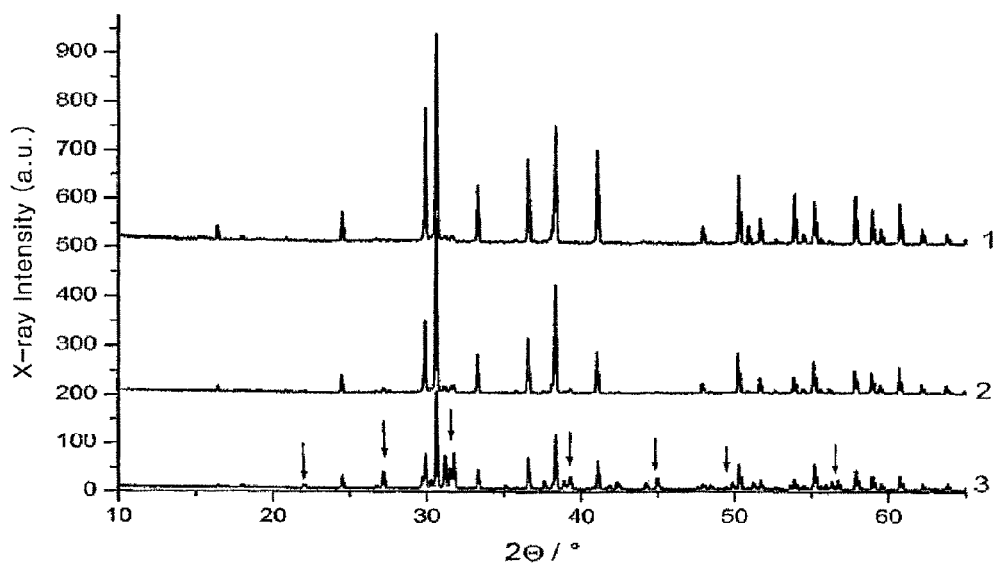
FIG. 1 shows X-ray diffraction diagrams of $Sr_3SiO_5$:Eu phosphors having different compositions.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

According an exemplary embodiment, selectively small amounts of strontium (Sr) are replaced by calcium (Ca) in a parent phosphor lattice $Sr_3SiO_5$ without changing the stoichiometry of the compound and the crystal structure thereof. Such a substitution leads to increased stability of a corresponding europium-activated oxyorthosilicate luminophore under exposure to atmospheric humidity and other environmental factors and to improvement in the lifetime of LEDs produced therefrom.

The effect of the calcium substitution is limited to compliance with a selected and narrow calcium concentration range. If this range is exceeded, the result of the continued incorporation of calcium into the $Sr_3SiO_5$ matrix is that the desired alkaline earth metal oxyorthosilicates may no longer form in the underlying phosphor synthesis and that instead the corresponding orthosilicates of the composition $(Sr, Ca)_2SiO_4$ may be formed almost exclusively.

In the case of mixed silicates having the general formula $(Sr_{1-x-y}Ca_xBa_y)_3SiO_5:Eu_z$ disclosed by WO 2006/081803A1, in which x may assume values up to 0.3, X-ray structure investigations have shown that the desired alkaline earth metal oxyorthosilicate phosphors can no longer be synthesized with a calcium fraction of x>0.05 under the known preparation conditions, and that instead alkaline earth metal orthosilicates are predominantly formed.

However, incorporation of small amounts of calcium where x<0.05, which does not interfere with formation of the $Sr_3SiO_5$ lattice, leads to a substantial improvement in the moisture resistance of the corresponding europium-doped luminophores and to a significant increase in the lifetime of LEDs produced therefrom.

The strontium oxyorthosilicate phosphors according to an exemplary embodiment which have improved stability to the resulting radiation load and resistance to the influence of atmospheric humidity, can be described by the general formula $Sr_{3-x-y-z}Ca_xM^{II}_ySiO_5:Eu_z$, where the molar calcium fraction x assumes values between 0 and 0.05, and values in the range of $\leq 0.25$ are typical for the molar europium fraction z. The optimum activator concentration depends on the specific conditions of use of the phosphors and can easily be determined experimentally.

In the general formula, $M^{II}$ represents further divalent metal ions which are selected from the group of elements magnesium (Mg), barium (Ba), copper (Cu), zinc (Zn) and manganese (Mn), and which optionally can additionally be incorporated into the parent phosphor lattice. In the case of barium, complete replacement of the strontium is possible. The proportion of the other divalent metal ions incorporated in addition to the strontium may be up to y=0.5.

Apart from europium (Eu), further divalent rare earth ions, such as samarium (Sm), ytterbium (Yb), or certain trivalent rare earth ions, for example, cerium ions ($Ce^{3+}$), are also suitable as activators.

For the purpose of optimizing the luminescence properties and the stability behavior, these phosphors may also undergo further modifications in their composition. Thus, is for example, silicon (Si) can be replaced by germanium (Ge), aluminum (Al), gallium (Ga), boron (B), or phosphorus (P). However suitable measures for preserving the charge balance may be necessary in the last-mentioned cases, which may include incorporating further monovalent cations, such as lithium (Li), sodium (Na) and potassium (K), or anions such as fluorine (F), chlorine (Cl), bromine (Br) or iodine (I) into the parent lattice.

In an exemplary embodiment, phosphors having improved stability under the resulting radiation load and resistance to the influence of atmospheric humidity have the formula $Sr_{3-x-y-z}Ca_xBa_ySiO_5:Eu_z$, with molar fractions of $0<x\leq 0.05$, $0\leq y\leq 0.5$ and $z\leq 0.25$.

Upon excitation with high-energy radiation, the phosphors emit in the visible part of the spectrum, preferably in the range between 560 and 620 nm, depending on their specific chemical composition. The excitability of the $Eu^{2+}$ luminescence ranges from 220 nm in the UV range to 550 nm in the visible range, which means that the luminophores can be excited with green light to produce yellow to orange or red light. Furthermore, intense and technically usable luminescence processes occur when the phosphors which have a very low Ca fraction according to an exemplary embodiment are irradiated by electron beams, X-rays, or gamma rays. Phosphors which have the very low Ca fraction according to the exemplary embodiment can be used as radiation converters for converting ionizing gamma rays, X-rays, electron beams, and ultraviolet, blue, or green light into longer-wavelength visible light in the yellow, orange and red spectral range. Thus, the phosphors can be used in a multiplicity of technical devices, for example in cathode ray tubes and other image-producing systems (scanning laser beam systems), in X-ray image converters, in fluorescent lamps and LEDs emitting colored and white light, in solar cells or greenhouse sheets and glasses as radiation converters, alone or in combination with other blue-, green-, yellow- and/or red-emitting phosphors.

The phosphors according to the exemplary embodiments are prepared on the basis of optionally multistage high-temperature solid-state reactions between alkaline earth metal carbonates which may be used as starting material or their corresponding oxides, and finely divided $SiO_2$. It may be possible also to add certain amounts of fluxes or mineralization additives, such as for example $NH_4Cl$, $NH_4F$ or certain alkali metal or alkaline earth metal fluorides, to the reaction mixture for promoting the reactivity and for controlling the particle size distribution of the resulting luminophores. These starting materials are thoroughly mixed and then ignited for 1 to 48 hours at temperatures of 1300 to 1700° C. in an inert or reducing atmosphere. The main ignition phase may optionally also have a plurality of ignition stages in different temperature ranges for the purpose of optimizing the phosphor properties. After the end of the ignition process, the samples are cooled to room temperature and subjected to suitable post-treatment processes which are intended, for example, to eliminate flux residues, minimize surface defects, or finely adjust particle size distribution. Instead of finely divided silica, silicon nitride ($Si_3N_4$) can also alternatively be used as a reactant for the reaction with the alkaline earth metal compounds.

Detailed information on the preparation of the phosphors having a low Ca fraction is described below.

WORKING EXAMPLE 1

For the preparation of a phosphor having a low Ca fraction in the composition $Sr_{2.9285}Ca_{0.03}Cu_{0.0015}SiO_5:Eu_{0.04}$, 432.4 g of $SrCO_3$, 3.0 g of $CaCO_3$, 0.12 g of CuO, 7.04 g of $Eu_2O$ and 60.94 g of $SiO_2$ are used as starting materials, to which 1.5 g of $NH_4F$ is added as a flux. After thorough homogenization, the batch mixture is transferred to corundum crucibles which are positioned in a high-temperature furnace. There, the solid mixtures are subjected to an is ignition regime which has a first 3 hour holding stage at 1200° C. and a second 5 hour holding stage at 1550° C. The ignitions are effected in pure oxygen until the 1550° C. ramp is reached and in an $N_2/H_2$ mixture that contains 20% of hydrogen during the 1550° C. phase. The post-treatment of the cooled ignited material includes its milling, the carrying out of wash processes, and the drying and screening of the end product.

WORKING EXAMPLE 2

For the preparation of an alkaline earth metal oxyorthosilicate phosphor of the inventive composition $Sr_{2.91}Ca_{0.04}Ba_{0.01}SiO_5:Eu_{0.04}$, 429.6 g of $SrCO_3$, 1.97 g of $BaCO_3$, 4.01 g of $CaCO_3$, 7.04 g of $Eu_2O_3$, 60.9 g of $SiO_2$ and 0.54 g of $NH_4Cl$ are thoroughly mixed and then ignited for 6 hours at a temperature of 1380° C. in an $N_2/H_2$ atmosphere having a proportion of 20% of hydrogen. After the end of the ignition process, the ignited material is homogenized by milling and then subjected again to a thermal treatment for two hours at 1350° C. in a reducing $N_2/H_2$ atmosphere having a hydrogen concentration of at least 5%. The final post-treatment of the synthesized phosphor sample is effected in the manner described in Example 1.

FIG. 1 shows the X-ray diffraction diagrams of europium-activated strontium oxyorthosilicate phosphors which differ from one another in the proportion of added calcium. Diffraction diagram 1 relates to the comparative material $Sr_{2.95}Ba_{0.01}Eu_{0.04}SiO_5$. Diffraction diagram 2 applies to the $Sr_3SiO_5$ phosphor $Sr_{2.95}Ba_{0.01}Ca_{0.02}Eu_{0.04}SiO_5$. Diffraction diagram 3 shows the $Sr_3SiO_5$ phosphor $Sr_{2.8}Ba_{0.01}Ca_{0.15}Eu_{0.04}SiO_5$. The arrows in the diagram mark the reflections characteristic of the $Sr_2SiO_4$ foreign phase structure.

Figure 2:
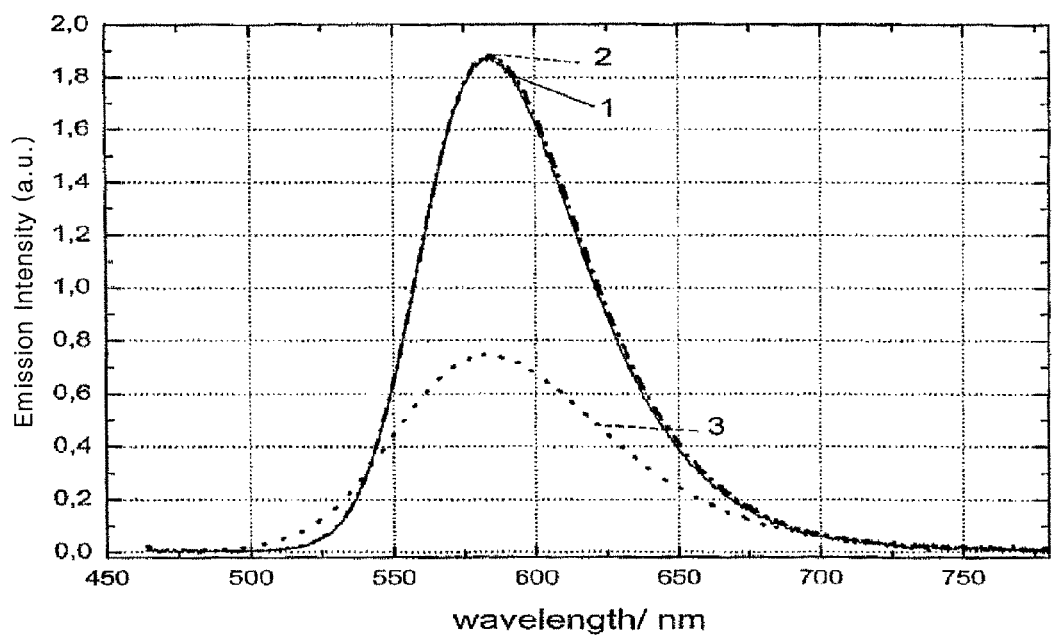
FIG. 2 shows emission spectra of luminophores having a selectively very low Ca fraction and of comparative luminophores.

FIG. 2 shows the emission spectra of luminophores having a selectively low proportion of calcium and of reference substances. The reference material $Sr_{2.95}Ba_{0.01}Eu_{0.04}SiO_5$ has the spectrum 1. The spectrum of the $Sr_3SiO_5$ phosphor $Sr_{2.95}Ba_{0.01}Ca_{0.02}Eu_{0.04}SiO_5$ is is characterized by 2 and the spectrum of the $Sr_3SiO_5$ phosphor $Sr_{2.8}Ba_{0.01}Ca_{0.15}Eu_{0.04}SiO_5$ is characterized by 3.

Both in the case of the pure $Sr_3SiO_5$ and in the case of an $Sr_{3-x-y-z}Ca_xBa_{0.01}SiO_5$ parent lattice having a calcium molar fraction of x=0.05, only the reflections of the $Sr_3SiO_5$ structure type which are known from the literature are found in the diffractograms, the diffraction angles of the calcium-substituted material having, as expected, a slight shift relative to those of the pure $Si_3SiO_5$ phase. In contrast, the diffractogram of that material shows that, in the preparation of an $Sr_{3-x-y-z}Ca_xBa_{0.01}SiO_5:Eu_z$ phosphor having a calcium fraction of x=0.1, reflections which are characteristic for the orthosilicate compounds of the $Sr_2SiO_5$ type was also obtained in addition to the reflections for the $Sr_3SiO_5$ phase with high intensity.

FIG. 3 listed the lattice constants and the proportions of the different crystallographic phases, calculated from the diffraction diagrams, of a series of compounds which were synthesized analogously to the preparation method stated in Example 1 and in which increasing amounts of calcium were incorporated into the $Sr_3SiO_5$ matrix. As shown in FIG. 3, the increase in the addition of calcium at first leads in principle to a reduction of the lattice constants of the $Sr_3SiO_5$ phase, the corresponding values for the luminophores having the calcium molar fraction of x<0.05 according to the invention differing only slightly from one another. Larger deviations from the known literature values and the lattice constants of the reference materials occur only in the case of calcium contents of x>0.05.

However, the effect of increased calcium concentrations is not limited to the further reduction of the lattice constants. As shown by the data listed in FIG. 3 for the percentage phase composition of the materials resulting in the case of increased calcium addition, mixtures of $Sr_3SiO_5$ and $Sr_2SiO_4$ phases are increasingly formed with increasing calcium fraction, instead is of the oxyorthosilicates of structure type $Sr_3SiO_5$, the proportion of the orthosilicate phase, based on the total mixture, in the case of a calcium fraction of x=0.01 already being 42%.

It is also evident from FIG. 3 that the oxyorthosilicate phosphors having a low calcium content according to the invention, as well as the calcium-free reference materials, have small traces of the phenomenon is known and may be attributed to a partial phase transformation on cooling of the corresponding ignited products, which could be ruled out in the high-temperature synthesis of the phosphors only with an unacceptably great effort. However, it may be considered to be proven that the efficiency of the oxyorthosilicate luminophores is not influenced by this extremely small proportion of foreign phase.

Both the luminescent efficiencies of the phosphors according to the exemplary embodiments and the temperature dependencies thereof are not inferior to those of commercially available $Sr_3SiO_5:Eu$ phosphors.

As demonstrated by the results listed in FIG. 4 for corresponding measurements, phosphors having comparable or higher luminescence outputs can be prepared on the basis of the preparation methods described in Examples 1 and 2.

In the case of the phosphors, a slight shift in the emission maxima to greater wavelengths is initially found with increasing calcium content. This could be due to the growing crystal field owing to the reduction of the lattice constants. Together with the crystallographic findings, these shifts in the optical parameters of the luminophores are also a reliable indication that the added amounts of calcium according to the invention are also actually incorporated in the described concentration range into the $Sr_3SiO_5$ lattice.

Calcium additions which exceed the region of x=0.05 on the other hand lead to silicate mixed phases whose luminescence properties are characterized by reduced efficiencies, is broadened emission spectra, and reduced temperature stabilities. This is also clear from FIG. 2, in which the emission spectra of the phosphors having a low calcium fraction according to the invention were compared with those of reference materials and calcium-rich mixed phases.

For assessing the moisture stability of the materials, the corresponding phosphor samples were stored in a conditioned chamber for a period of 7 days at a temperature of 85° C. and 85% relative humidity. Thereafter, the luminophores were dried at 150° C. and then subjected to a comparative measurement of the luminescence yield. Exemplary results of such investigations are listed in FIG. 5. The data in FIG. 5 show that both commercially available $Sr_3SiO_5:Eu$ and the $(Sr_{29.5}Ba_{0.01}Eu_{0.04})SiO_5$, phosphor prepared for reference purposes have only about 70% of their original luminescent efficiency after the described procedure involving storage in a moist atmosphere.

However, the europium-doped oxyorthosilicate phosphors of the $Sr_3SiO_5:Eu$ type, in which, according to the exemplary embodiments, a selectively small proportion of the strontium has been replaced by calcium, without adversely affecting the formation of the $Sr_3SiO_5$ structure thereby, have substantially improved moisture resistances. After storage for seven days in an 85° C./85% relative humidity atmosphere, luminescence yields of >90%, and of >95% in the case of optimized samples, were still found.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A phosphor comprising the formula $Ba_{3-x-y-z}Ca_xM^{II}_ySiO_5:D_z$, wherein $M^{II}$ is a divalent metal ion comprising at least one of Mg, Cu, Zn, and Mn;

D is an activator comprising at least one of Eu, Sm, Yb, and Ce;

$0 < x \leq 0.05$;

$0 \leq y \leq 0.5$; and $0 < z \leq 0.25$.

2. The phosphor of claim 1, wherein D is Eu.

* * * * *